Oct. 8, 1963
W. P. ASTEN
3,106,124
TUNING FORKS
Filed July 21, 1961
2 Sheets-Sheet 1
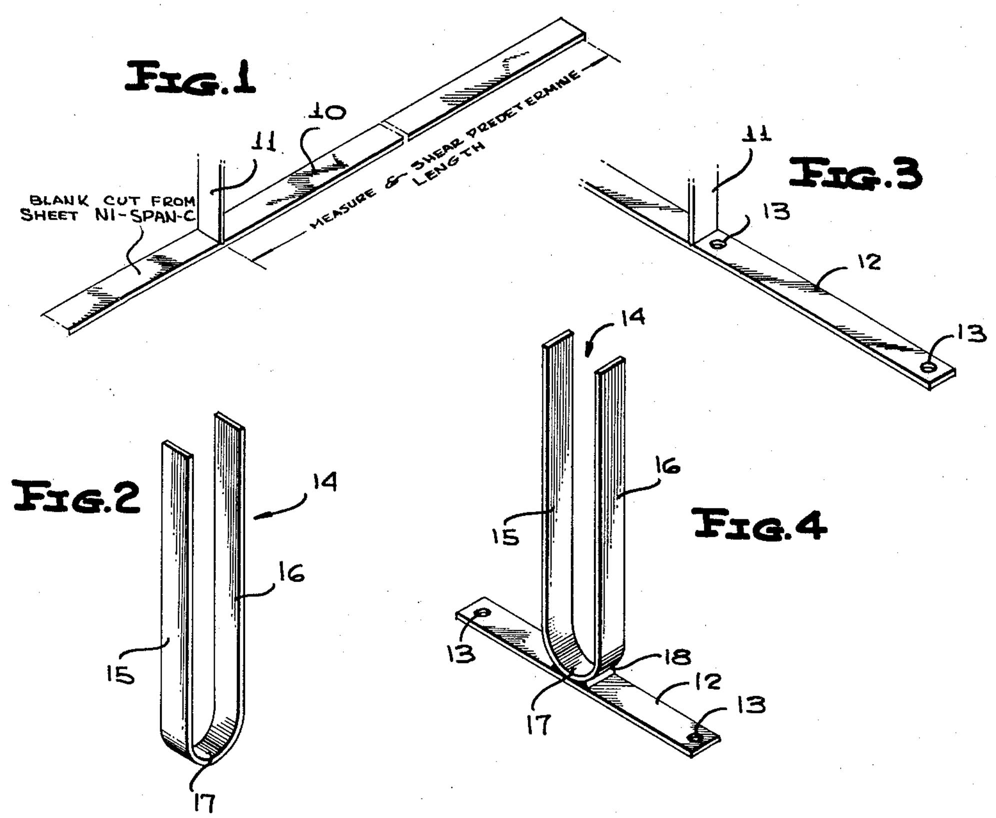
FIG. 1, FIG. 2, FIG. 3, FIG. 4
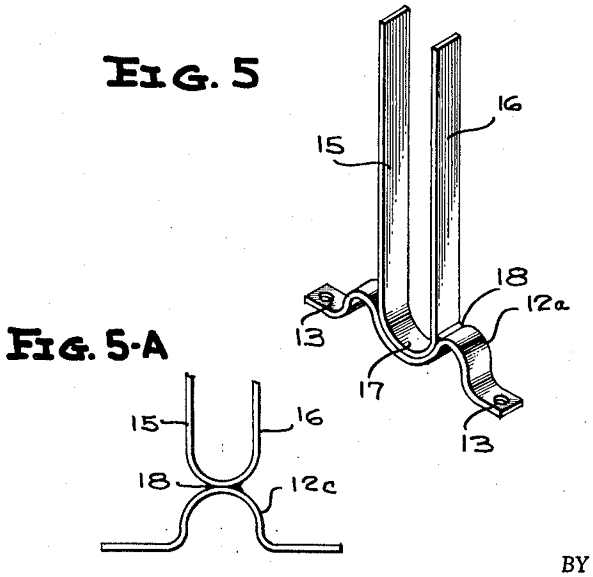
FIG. 5, FIG. 5-A
FIG. 6
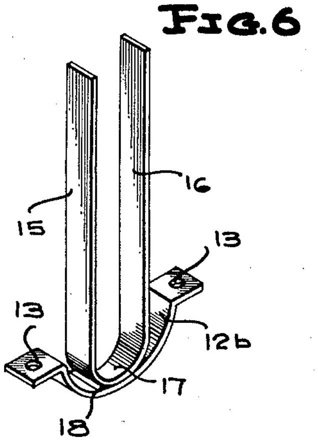
INVENTOR
WILLIAM P. ASTEN
BY Hurwitz and Rose
ATTORNEYS Oct. 8, 1963 W. P. ASTEN 3,106,124

TUNING FORKS

Filed July 21, 1961 2 Sheets-Sheet 2

INVENTOR
WILLIAM P. ASTEN

BY Hurvitz and Rose

ATTORNEYS 3,106,124

TUNING FORKS

William P. Asten, Aldie, Va., assignor to Melpar, Inc., Falls Church, Va., a corporation of Delaware
Filed July 21, 1961, Ser. No. 125,872
2 Claims. (Cl. 84—457)

The present invention relates generally to tuning forks, and more particularly to tuning forks fabricated of formed sheet metal parts and to methods of fabricating such tuning forks.

Tuning forks have heretofore been fabricated by machining the forks from a solid block of metal. This has involved considerable costs of both material and labor, and has rendered spoilage during fabrication a matter of considerable economic importance. It has not heretofore been considered feasible to fabricate tuning forks of sheet metal, as by forming the forks and their mountings by bending, and assembling the parts by soldering or welding.

In accordance with the present invention, tuning forks are fabricated by shearing blanks from a sheet of metal, the thicknesses, widths and lengths of the blanks being appropriate to the fundamental frequency desired. Each fork is fabricated of two elements, which are joined together by welding or soldering. One of these elements is designed to vibrate as a tuning fork. The other element, which is a transversely extending mounting element, is selected to avoid resonance of the tuning fork assembly vibrating as a reed, i.e. the combination of fork and transverse mounting element are selected to have a resonance frequency, known as reed frequency, which falls below that of the fork itself, and such that no harmonics of the fork and reed frequencies coincide.

The tuning fork element, i.e., the fork and mounting element, are normally initially fabricated to have slightly lower than a desired value of fork frequency and, after being joined, the tines are abraded until both tines of the fork are equal in frequency at only slightly below the desired value. The complete fork assembly is then placed in a gas tight container, which is evacuated to low pressure, the pressure being selected such that the fork attains its precisely correct frequency.

The metal of which the fork and mounting element are frabricated is NI–SPAN–C (a trademark), provided in sheet form by International Nickel Corp. The metal as currently available has a Curie point of about 160° C. and a negative temperature coefficient of elasticity. It has been found that precipitation hardening of the metal brings about a zero temperature coefficient of elasticity which can be set to occur at a desired value, i.e., 15° C. The temperature coefficient of elasticity is then positive on either side of the 15° C. temperature. This characteristic is attainable by precipitation hardening of the metal only, so far as I am aware, and the precise process, in terms of times, temperatures, and the like, is arrived at empirically and varies with different batches of metal. Since the general procedure is understood, and in fact is provided and taught to purchasers by the manufacturer of the alloy, details of the process are not described herein.

The transverse mounting strip is bolted at its ends, and may also be brazed or otherwise joined, to a solid mounting block, which in turn may be secured within the evacuated container so that the mounting strip and the tines are free to vibrate.

The fork as a whole, i.e., the tines, transverse mounting strip and the usual drives and circuitry, is shock mounted. In order to shock mount the fork as a whole, the fork circuitry is mounted on the mounting block, and the mounting block itself located diagonally of the evacuated container, which is rectangular in cross-section. Two rubber-like elements of triangular shape are placed between the mounting block and the inner walls of the container, at opposed corners of the container. It has been found that the described mounting provides protection against shock and vibration, i.e., that in response to a 500–G shock, the fork, in a few seconds, returns to its correct frequency and continues in operation as if no shock had occurred. Under vigorous vibration the fork does change its frequency slightly, but the changes are transient and of such slight degree as to be acceptable commercially and for most military uses.

The tuning fork construction of the present invention can be utilized in conjunction with any available and known circuitry. One suitable circuit is shown in the U.S. patent to Asten, No. 2,874,602, which, in addition, discloses a construction for stabilizing fork frequency as a function of temperature, which is applicable to the fork of the present invention. In essence, the patent construction requires that the metal of a tuning fork be such that the curve of frequency variation with temperature for tuning forks fabricated of the metal have a minimum value, which may be pre-set by suitable heat treatment of the fork, and which is positive for both increases and decreases from the minimum value. These conditions are met by the fork of the present invention.

It is, accordingly, a primary object of the present invention to provide a novel tuning fork fabricated of sheet material which is bent into shape.

It is another object of the present invention to provide a tuning fork composed of tines and of a transverse mounting element, which may be individually sheared from a sheet of the same suitable magnetic material, or the mounting element may be sheared from a separate non-magnetic material which is heat treatable wherein the tines and support are bonded to form a vibrating unit having a fork frequency and a reed frequency, the reed frequency being anharmonically related to the fork frequency.

A further object of the invention relates to a novel method of fabricating tuning forks.

Still another object of the invention resides in the provision of novel arrangements for mounting tuning forks within containers, for minimizing the effects of shock and vibration.

The above and still further objects, features and advantages of the present invention will become apparent upon consideration of the following detailed description of one specific embodiment thereof, especially when taken in conjunction with the accompanying drawings, wherein:

FIGURE 1 is a view in perspective of a sheet of material to be formed as tines of a tuning fork;

FIGURE 2 is a view in perspective of tines formed from the sheet of FIGURE 1;

FIGURE 3 is a view in perspective of a sheet of material to be formed as a mounting strip for the tines of FIGURE 2;

FIGURE 4 is a view in perspective of the tines of FIGURE 2 assembled to a mounting strip;

Figure 7:
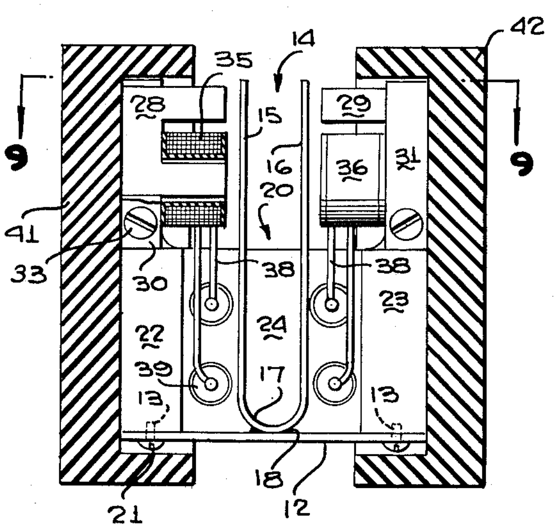
Figure 8:
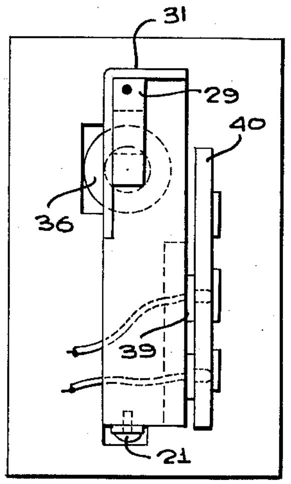

FIGURES 5, 5*a* and 6 are views in perspective of the tines of FIGURE 2 assembled to mounting strips of various curvilinear configurations;

FIGURE 7 is a view largely in front elevation, and partly in section, of an assembled tuning fork according to the present invention;

FIGURE 8 is an end view corresponding with FIGURE 7; and

Figure 9:
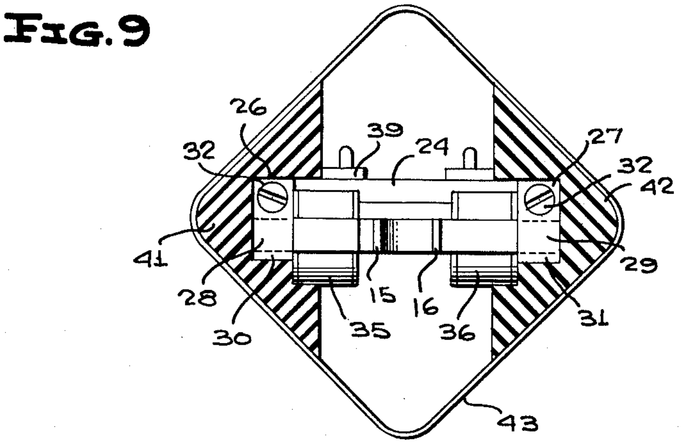

FIGURE 9 is a view in transverse section taken on the line 9—9 of FIGURE 7.

Referring now to the accompanying drawings, the tine 14 is manufactured from a strip of material 10, specifically NI–SPAN–C, which has been precipitation hardened to have a zero temperature coefficient of elasticity at 15° C., and a positive temperature coefficient of elasticity both above and below 15° C. The temperature coefficient of elasticity is then positive on either side of 15° C. For one specific fork frequency the width of the strip may be .145", the thickness of the strip may be .030", and the overall length such as to permit forming of tines 1½" long, allowing for a U-bend which brings the tines to an outside separation of .250". The strip 10, as usually purchased, is 3" wide and any length with 0.145" wide strips sheared from the sheet parallel to the 3" dimension by a suitable tool and the proper length sheared by tool 11, as shown.

Similarly, as viewed in FIGURE 3, a suitable length of a suitable strip material is sheared by shear 11 to form a transverse mounting strip 12. The latter may be provided with bolt holes 13 adjacent its ends. Strip 12 may be the same material utilized for the tine or some other material which retains its characteristics after heat treating bonding processes such as welding or silver soldering; an example of such material being beryllium copper.

The finished fork element 14, illustrated in FIGURE 2, and including two parallel tines 15 and 16, joined by a bend 17, is then secured to the transverse member 12 at the center of the latter, as by soldering, brazing or welding, the joint being identified by the reference numeral 18. The fork 14 is located symmetrically of the transverse member 12 and the tines 15, 16 extend perpendicularly thereof. The planes of the tines 15, 16 are perpendicular of the plane of the transverse member 12.

If desired, the mounting strip 12 may be formed in serpentine shape 12*a* (FIGURE 5), in U-shape 12*b* (FIGURE 6), instead of flat (FIGURE 4), or inverted U-shape as in FIGURE 5*a*.

The resonant frequency of the fork 14 is selected to be slightly lower than the desired system resonant frequency. The tines are then abraded until both tines vibrate at precisely the same frequency, the latter being very slightly below the desired value. The mounting element is selected, in length, to have a natural frequency higher than that of the tines, and the combination of tines 15, 16 and mounting element 12 (12*a*, 12*b*) is designed to have a resonant frequency, known as the read frequency, which falls below that of the fork itself, and such that no harmonics of reed and fork frequency coincide. Thereby the fork is mechanically isolated, and can vibrate at its own natural frequency without imparting vibrations of significant amplitude to the mounting element, and vibrations at reed frequency are insignificant in amplitude. Moreover, this isolation provides, as a natural consequence, high Q, i.e., an element having low energy losses during each cycle of oscillation at its natural frequency.

The transverse element 12 is secured to a solid metallic mounting block 20, by any suitable means such as by bolts 21 extending through openings 13 in element 12, FIGURE 7, to the end of the block 20 or by soft soldering the reed ends to block 20. The block 20 includes two relatively thick vertical end elements 22, 23 joined by a relatively thin vertical web 24. The fork 14 extends between the end elements 22, 23 centrally of the web 24 and spaced therefrom, so that the transverse element 12 may extend between the ends of end elements 22, 23. Extending vertically upwards from the thick vertical end elements 22, 23 are two pillars 26, 27. Two U-magnets 28, 29 are clamped against the pillars 26, 27 by L-clamps 30, 31, secured by bolts 32, 33. A vertical arm of clamp 31, for example, is bolted to pillar 27 by bolt 33, and a horizontal arm to the top of pillar 27 by bolt 32. Cylindrical energizing coils 35, 36 are mounted on the lower arms of the C-magnets 28, 29, and the tines 15, 16 of the fork 14 are located adjacent the poles of the magnets 28, 29, which extend toward each other into proximity with the outer surfaces of the tines 15, 16.

Energizing current for the coils 35, 36 is delivered thereto by leads 38, which proceed to insulated terminals 39, extending through the web 24. Transistor oscillator circuitry, of conventional character per se, is mounted on printed circuit board 40, which plugs into the terminals 39 on the side of web 24 opposite to that on which the fork 14 is mounted.

The entire fork and circuit assembly is secured between shock mounts, 41, 42, molded of Silastic or other highly resilient rubber-like material. The shock mounts 41, 42 have lips extending over and under the ends of the mounting block 20, and internally conform snugly to the shape of the mounting blocks 20, so that maximum bearing surface of the mounting block 20 exists with respect to the shock mounts. The latter are of triangular cross-section, and spaced and dimensioned when mounted to fit snugly between opposed corners of a metallic container 43 of rectangular cross-section.

A complete tuning fork unit, according to the invention, including the requisite electronic drive circuit, may be mounted in a container of 2.6 cubic inch volume, and weighs 3 ounces. The present unit is, accordingly, smaller and lighter than known, available units, and can be fabricated more economically. The shock mounting technique adds little to costs, yet simplifies the problem of retaining the unit within its container, and of permitting effective operation under conditions of extreme shock and vibration.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A tuning fork comprising two planar tines extending parallel to one another in a first direction, a curvilinear base extending between and joining said tines, said tines and base being a single layer of resilient and bendable sheet material, a mounting bracket secured to said base, said mounting bracket extending perpendicularly of said first direction and outwardly and laterally of the planes of said planar tines, said tines having a predetermined fundamental fork resonance frequency, the dimensions and material of said mounting bracket being selected to provide a reed resonant frequency for said tines and mounting bracket together which is substantially below said fundamental fork resonance frequency and is anharmonically related to said fundamental fork resonance frequency, the dimensions and materials of said tines and said mounting bracket being selected to provide resonant modes of vibration of said tines alone and of said tines and mounting bracket together which do not coincide and to provide a fundamental natural frequency of said mounting bracket alone which is higher than said fundamental fork resonance frequency.

2. The combination according to claim 1, wherein is provided a mounting block; means securing said mounting element to said mounting block at two points of said mounting bracket, a container for said tuning fork, said container having a rectangular cross section, said mounting block being located within said container and extending diagonally of said cross section, and masses of resilient material located intermediate said mounting block and at least two opposed corners of said container and filling the space between said mounting block and said opposed corners of said container.

References Cited in the file of this patent

UNITED STATES PATENTS

| | | |
|---|---|---|
| 1,906,985 | Marrison | May 2, 1933 |
| 2,283,750 | Mikelson | May 19, 1942 |
| 2,872,598 | Birkemeier | Feb. 3, 1959 |
| 2,949,727 | Hetzel | Aug. 23, 1960 |
| 2,971,104 | Holt | Feb. 7, 1961 |
| 2,994,241 | Gibbs | Aug. 1, 1961 |